US012762308B2

(12) United States Patent
Goswami et al.

(10) Patent No.: US 12,762,308 B2
(45) Date of Patent: Oct. 13, 2026

(54) METHOD AND SYSTEM FOR GENERATING A GEOMETRIC COMPONENT USING MACHINE LEARNING MODELS

(71) Applicant: Siemens Industry Software Inc., Plano, TX (US)

(72) Inventors: Debarshi Goswami, Pune (IN); Yeshvendra Singh, Pune (IN); Umarsharif Kudchi, Pune (IN)

(73) Assignee: Siemens Industry Software Inc., Plano, TX (US)

( * ) Notice: Subject to any disclaimer, the term of this patent is extended or adjusted under 35 U.S.C. 154(b) by 965 days.

(21) Appl. No.: 18/012,651

(22) PCT Filed: Aug. 13, 2020

(86) PCT No.: PCT/US2020/046085

§ 371 (c)(1),
(2) Date: Dec. 22, 2022

(87) PCT Pub. No.: WO2021/262205

PCT Pub. Date: Dec. 30, 2021

(65) Prior Publication Data

US 2023/0252207 A1 Aug. 10, 2023

(30) Foreign Application Priority Data

Jun. 23, 2020 (IN) ............................. 202031026481

(51) Int. Cl.
*G06F 30/27* (2020.01)
*G06F 30/10* (2020.01)
*G06F 111/02* (2020.01)

(52) U.S. Cl.
CPC .............. *G06F 30/27* (2020.01); *G06F 30/10* (2020.01); *G06F 2111/02* (2020.01)

(58) Field of Classification Search
CPC ...... G06F 30/27; G06F 30/10; G06F 2111/02; G06T 19/20
See application file for complete search history.

(56) References Cited

U.S. PATENT DOCUMENTS 6,629,065 B1 * 9/2003 Gadh ...................... G06T 19/20 703/1
10,762,699 B2 * 9/2020 Liu ......................... G06T 17/10
(Continued)

FOREIGN PATENT DOCUMENTS

CN 108351909 A 7/2018
CN 110400370 A 11/2019
(Continued)

OTHER PUBLICATIONS

PCT International Search Report and Written Opinion of International Searching Authority mailed Mar. 16, 2021, for International App. PCT/US2020/046085.

*Primary Examiner* — Dennis G Bonshock
(74) *Attorney, Agent, or Firm* — Lempia Summerfield Katz LLC

(57) ABSTRACT

A method and system for generating a geometric component in a computer-aided design (CAD) environment using machine learning models is provided. A computer-implemented method for generating a geometric component in a CAD environment includes determining a geometric operation to be performed on at least one geometric component in the CAD environment based on a CAD command selected by a user. The method also includes determining one or more candidate groups including one or more candidates in the geometric component suitable for performing the geometric operation using one or more trained machine learning models. The method also includes identifying at least one candidate group from the one or more candidate groups on which the geometric operation is to be performed. The
(Continued)

method also includes performing the geometric operation on the one or more candidates in the identified candidate group.

17 Claims, 8 Drawing Sheets

(56) References Cited

U.S. PATENT DOCUMENTS

| | | | | |
|---|---|---|---|---|
| 2008/0174599 | A1* | 7/2008 | Rothstein | G06T 17/10 345/420 |
| 2010/0305906 | A1* | 12/2010 | Yu | G06F 30/10 703/1 |
| 2018/0032646 | A1 | 2/2018 | Wright et al. | |
| 2018/0349546 | A1 | 12/2018 | Bhave et al. | |
| 2019/0282344 | A1 | 9/2019 | Azernikov et al. | |
| 2020/0175669 | A1 | 6/2020 | Bian et al. | |
| 2020/0210845 | A1* | 7/2020 | Sanchez Bermudez | G06N 5/046 |
| 2020/0211276 | A1* | 7/2020 | Mehr | G06N 3/09 |
| 2020/0218835 | A1* | 7/2020 | Baran | G06T 19/20 |
| 2023/0014934 | A1* | 1/2023 | Mezghanni | G06F 30/17 |

FOREIGN PATENT DOCUMENTS

| | | | |
|---|---|---|---|
| CN | 111272763 | A | 6/2020 |
| EP | 3617912 | A1 | 3/2020 |

* cited by examiner

700

METHOD AND SYSTEM FOR GENERATING A GEOMETRIC COMPONENT USING MACHINE LEARNING MODELS

This application is the National Stage of International Application No. PCT/US2020/046085, filed Aug. 13, 2020, which claims the benefit of Indian Patent Application No. IN 202031026481, filed Jun. 23, 2020. The entire contents of these documents are hereby incorporated herein by reference.

FIELD OF TECHNOLOGY

The present disclosure generally relates to the field of computer-aided design (CAD), and more particularly to a method and system for generating a geometric component in a CAD environment using machine learning models.

BACKGROUND

A Computer-aided design application enables users to create a three-dimensional geometric component of a physical object via a graphical user interface. A user may manually perform a number of operations to generate a geometric component of a physical object through interaction with the graphical user interface. For example, to create a hole in a rectangular block, a user may have to specify a diameter, location, and length of a hole via the graphical user interface. If the user wants to have holes at a number of locations in the rectangular block, then the user is to select the locations where the hole is to be created. If the same operation is to be performed multiple times on similar entities, the user is to repeat the same activity (e.g., panning, zooming, rotation, selecting, etc.) over and again. Repeating the same operation multiple times may become a time consuming and monotonous activity. Also, some of these operations are carried out based on experience and expertise of the user. Therefore, a beginner or less experienced user may find it difficult to perform the operations without having significant exposure to a job role, domain, and industry. Thus, the beginner or less experienced user may make errors while performing the operations on the geometric component. Typically, these errors are identified post design of the geometric component during a design validation process. However, correction of these errors may be a cumbersome and time-consuming activity and may also increase time-to-market of the physical object.

SUMMARY AND DESCRIPTION

A method and system for generating a geometric component in a computer-aided design (CAD) environment using one or more machine learning models is provided. In one aspect, a computer-implemented method for generating a geometric component in a CAD environment includes determining a geometric operation to be performed on at least one geometric component in the CAD environment based on a CAD command selected by a user. Then, the method includes determining one or more candidate groups including one or more candidates in the geometric component suitable for performing the geometric operation using one or more trained machine learning model. In an embodiment, the method may include generating feature data associated with the geometric component. The feature data includes object feature data associated with the geometric component. The method may include predicting a plurality of candidates associated with the geometric operation to be performed on the geometric component based on the generated feature data using the one or more trained machine learning models. In predicting the plurality of candidates, the method may include computing a probability of the geometric operation likely to be performed on each of the objects in the geometric component using the one or more trained machine learning models, and identifying the plurality of candidates suitable for performing the geometric operation based on the probability of the geometric operation likely to be performed on each of the objects in the geometric component. The method may include creating the one or more candidate groups including one or more candidates from the plurality of the candidates based on predefined grouping rules.

Further, the method includes identifying at least one candidate group from the one or more candidate groups on which the geometric operation is to be performed. In an embodiment, the method may include computing a probability value for each of the candidate groups based on the probability value associated with the candidates in said each candidate group. Also, the method may include sorting the one or more candidate groups including the one or more candidates based on the computed probability value for said each candidate group.

Further, the method includes performing the geometric operation on the one or more candidates in the identified candidate group. Also, the method may include displaying the geometric component indicating the one or more candidates in the identified candidate group on a graphical user interface. Additionally, the method may include identifying the one or more trained machine learning models from a plurality of trained machine learning models based on the geometric operation to be performed on the geometric component.

In another aspect, a data processing system for generating a geometric component in a CAD environment includes a processing unit and a memory unit communicatively coupled to the processing unit. The memory unit includes a component generation module configured to determine a geometric operation to be performed on at least one geometric component in the CAD environment based on a CAD command selected by a user. The component generation module is configured to determine one or more candidate groups including one or more candidates in the geometric component suitable for performing the geometric operation using one or more trained machine learning model. Further, the component generation module is configured to identify at least one candidate group from the one or more candidate groups on which the geometric operation is to be performed. Further, the component generation module is configured to perform the geometric operation on the one or more candidates in the identified candidate group. Also, the data processing system may include a display unit configured to display the geometric component indicating the one or more candidates in the identified candidate group on a graphical user interface.

Additionally, the component generation module may be configured to generate feature data associated with the geometric component. The feature data includes object feature data associated with the geometric component. The component generation module may be configured to predict a plurality of candidates associated with the geometric operation to be performed on the geometric component based on the generate feature data using the one or more trained machine learning models, and create the one or more candidate groups including one or more candidates from the plurality of the candidates based on pre-defined grouping rules.

Also, the component generation module may be configured to compute a probability of the geometric operation likely to be performed on each of the objects in the geometric component using the one or more trained machine learning models, and identify the plurality of candidates suitable for performing the geometric operation based on the probability of the geometric operation likely to be performed on each of the objects in the geometric component. The component generation module may be configured to compute a probability value for each of the candidate groups based on the probability value associated with the candidates in said each candidate group. Further, the component generation module may be configured to sort the one or more candidate groups including the one or more candidates based on the computed probability value for said each candidate group.

Further, the component generation module may be configured to identify the one or more trained machine learning models from a plurality of trained machine learning models based on the geometric operation to be performed on the geometric component.

In yet another aspect, a non-transitory computer-readable storage medium having machine-readable instructions stored therein, that when executed by the data processing system, cause the data processing system to perform a method for generating a geometric component in a computer-aided design (CAD) environment described above is provided.

This summary is provided to introduce a selection of concepts in a simplified form that are further described below in the following description. This summary is not intended to identify features or essential features of the claimed subject matter. Further, the claimed subject matter is not limited to implementations that solve any or all disadvantages noted in any part of this disclosure.

DETAILED DESCRIPTION

Figure 1:
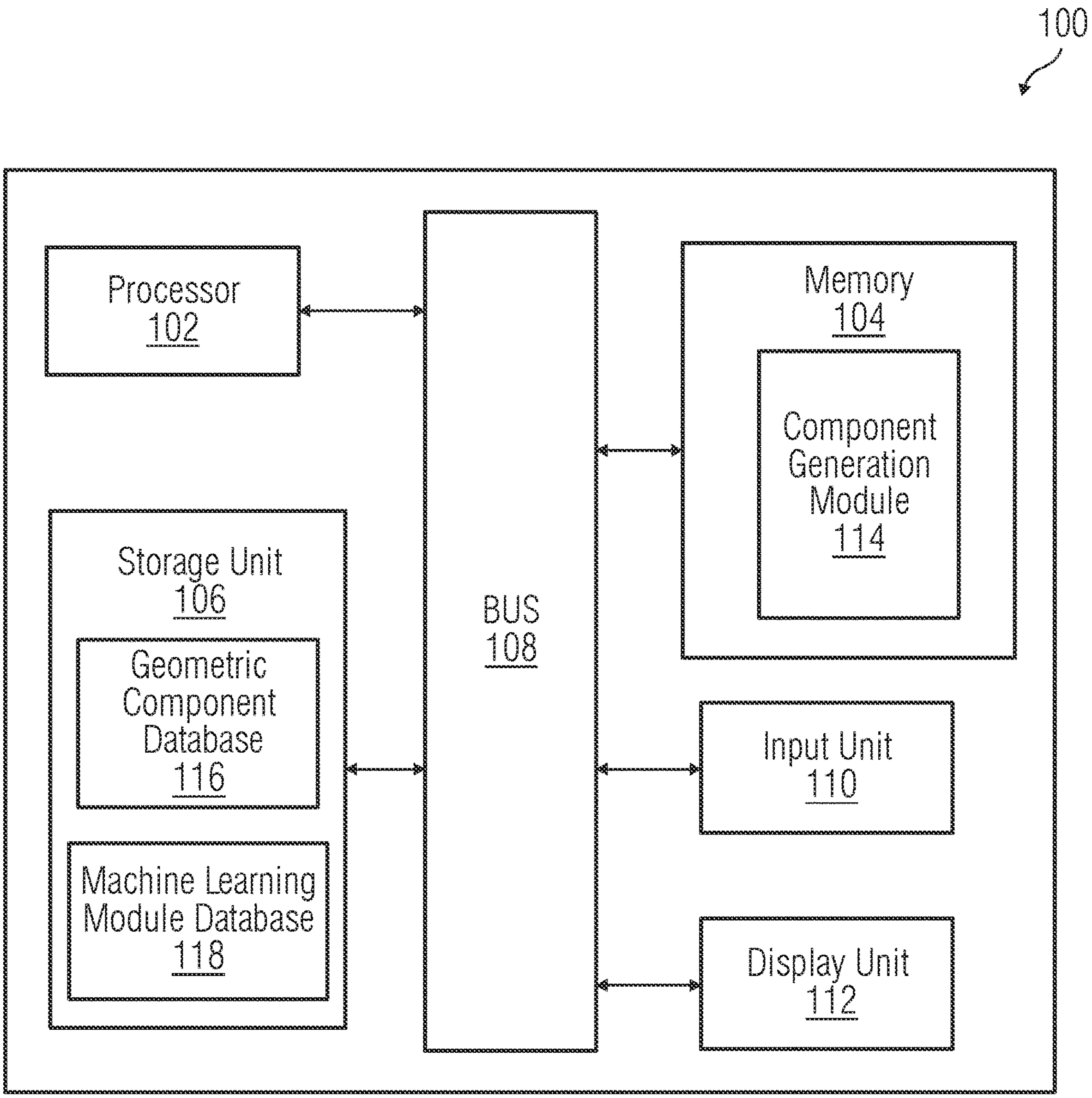
FIG. 1 is a block diagram of a data processing system for generating a geometric component using machine learning models, according to one embodiment.

A method and system for generating a geometric component using machine learning models are provided. Various embodiments are described with reference to the drawings, where like reference numerals are used in reference to the drawings. Like reference numerals are used to refer to like elements throughout. In the following description, numerous specific details are set forth in order to provide a thorough understanding of embodiments. These specific details need not be employed to practice embodiments. In other instances, well known materials or methods have not been described in detail in order to avoid unnecessarily obscuring embodiments. While the disclosure is susceptible to various modifications and alternative forms, specific embodiments thereof are shown by way of example in the drawings and will herein be described in detail. There is no intent to limit the disclosure to the particular forms disclosed. Instead, the disclosure is to cover all modifications, equivalents, and alternatives falling within the spirit and scope of the present disclosure.

FIG. 1 is a block diagram of a data processing system 100 for generating a geometric component using one or more trained machine learning models, according to one embodiment. The data processing system 100 may be a personal computer, workstation, laptop computer, tablet computer, and the like. In FIG. 1, the data processing system 100 includes a processing unit 102, a memory 104, a storage unit 106, a bus 108, an input unit 110, and a display unit 112. The data processing system 100 is a specific purpose computer configured to generate a geometric component using one or more trained machined learning models.

The processing unit 102, as used herein, may be any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 102 may also include embedded controllers, such as generic or programmable logic devices or arrays, application specific integrated circuits, single-chip computers, and the like.

The memory 104 may be non-transitory volatile memory and non-volatile memory. The memory 104 may be coupled for communication with the processing unit 102, such as being a computer-readable storage medium. The processing unit 102 may execute instructions and/or code stored in the memory 104. A variety of computer-readable instructions may be stored in and accessed from the memory 104. The memory 104 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

In the present embodiment, the memory 104 includes a component generation module 114 stored in the form of machine-readable instructions on any of the above-mentioned storage media and may be in communication to and executed by the processing unit 102. When the machine-readable instructions are executed by the processing unit 102, the component generation module 114 causes the processing unit 102 to: determine a geometric operation to be performed on a geometric component in a Computer-Aided Design (CAD) environment based on a CAD command selected by a user via a graphical user interface; determine one or more candidate groups including one or more candidates in the geometric component suitable for performing the geometric operation using one or more trained machine learning models; identify at least one candidate group from the one or more candidate groups on which the geometric operation is to be performed; and perform the geometric operation on the one or more candidates in the identified candidate group. Method acts performed by the processing unit 102 to achieve the above functionality are described in greater detail in FIG. 2.

The storage unit 106 may be a non-transitory storage medium that stores a geometric component database 116 and a machine learning model database 118. The geometric component database 116 stores geometric feature information associated with geometric components. The machine learning model database 118 is for storing the trained machine learning models for determining candidates in a geometric component for performing a geometric operation. Examples of machine learning models may include deep neural network models, random forest models, XGBoost models, and so on. The input unit 110 may include input devices such as keypad, touch-sensitive display, camera (e.g., a camera receiving gesture-based inputs), etc. capable of receiving input signals such as a CAD command for performing a geometric operation on a geometric component. The display unit 112 may be a device with a graphical user interface displaying a multi-dimensional visual representation of the geometric component. The graphical user interface may also enable users to select a CAD command for performing the geometric operation on the geometric component. The bus 108 acts as interconnect between the processing unit 102, the memory 104, the storage unit 106, the input unit 110, and the display unit 112.

Those of ordinary skilled in the art will appreciate that the hardware depicted in FIG. 1 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition to or in place of the hardware depicted. The depicted example is provided for the purpose of explanation only and is not meant to imply architectural limitations with respect to the present disclosure.

The data processing system 100 in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button may be generated to actuate a desired response.

One of various commercial operating systems, such as a version of Microsoft Windows™, a product of Microsoft Corporation located in Redmond, Washington, may be employed if suitably modified. The operating system is modified or created in accordance with the present disclosure as described.

Figure 2:
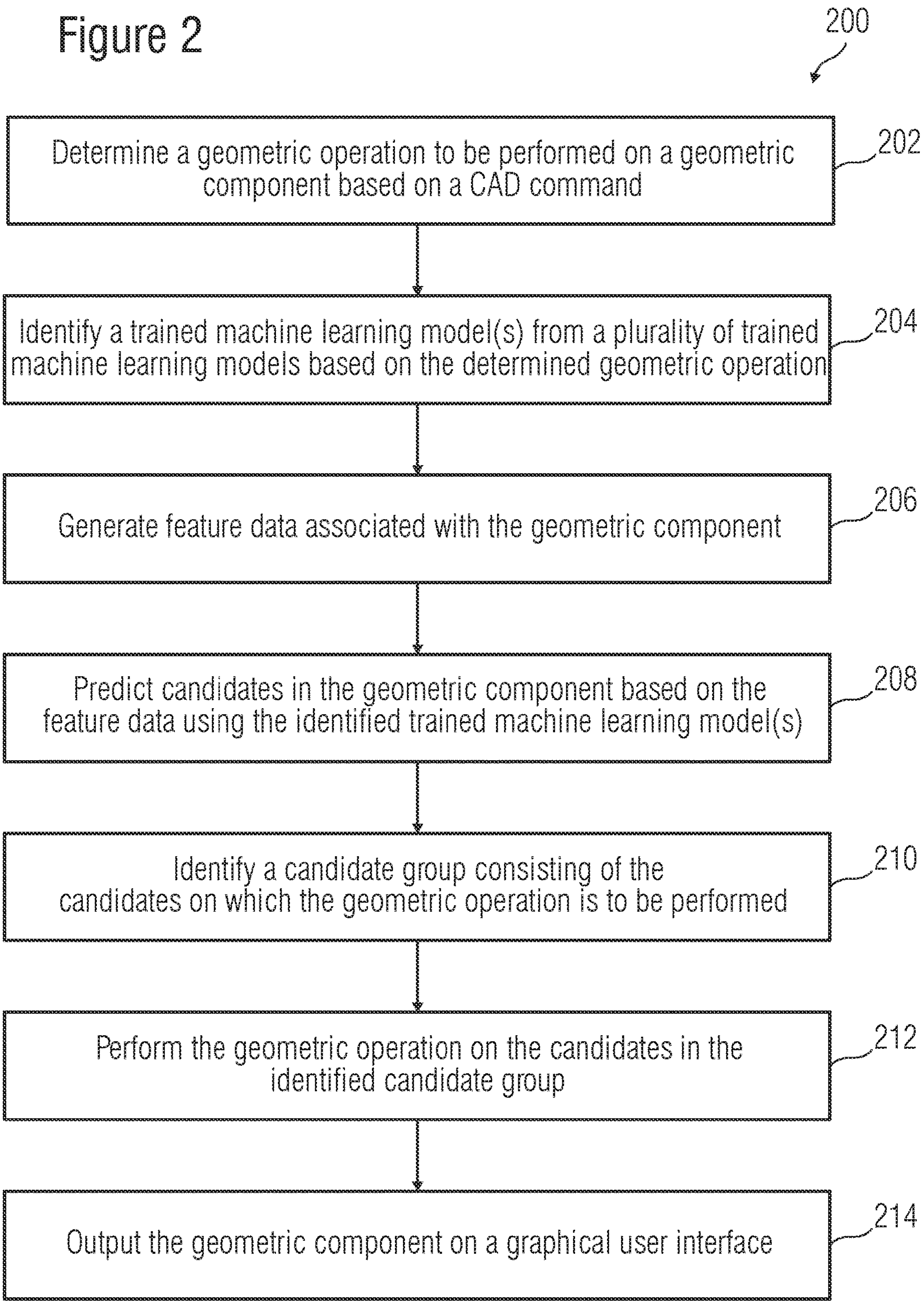
FIG. 2 is a process flowchart of a method of generating a geometric component using trained machine learning models in a computer-aided design (CAD) environment, according to one embodiment.

FIG. 2 is a process flowchart 200 a method of generating a geometric component using one or more trained machine learning models in a computer-aided design (CAD) environment, according to one embodiment. At act 202, a geometric operation to be performed on a geometric component in a CAD environment is determined based on a CAD command selected by a user. The geometric component may be a two-dimensional CAD model or three-dimensional CAD model of a single part or assembly of parts of the physical object. The geometric operation may be any operation that a CAD application enables to perform on the geometric component. The CAD command (e.g., edge blend, extrude, trim, chamfer, etc.) may enable to perform the geometric operation on the geometric command. The user may select the CAD command via a graphical user interface of the data processing system 100. For example, consider that a user wants to perform an edge blend operation on a three dimensional CAD model of a rectangular block. When a user selects an edge blend command via a graphical user interface of the display unit 112, the data processing system 100 determines a geometric operation to be performed on the rectangular block is edge blend.

At act 204, one or more trained machine learning models are identified from a plurality of trained machine learning models based on the geometric operation to be performed on the geometric component. Examples of trained machine learning models may include deep neural network, random forest, XGBoots, and the like. In one embodiment, a single trained machine learning model capable of identifying one or more candidate groups consisting of candidates suitable for performing the geometric operation is selected from the plurality of trained machine learning models. For example, a trained deep neural network model capable of identifying one or more edges in the rectangular block for performing an edge blend operation is selected from the plurality of trained machine learning models. In another embodiment, multiple trained machine learning models capable of identifying one or more candidate groups including candidates suitable for performing the geometric operation is selected from the plurality of trained machine learning models. For example, a trained deep neural network model, random forest model, and XGBoost model capable of identifying one or more edges in the rectangular block for performing an edge blend operation is selected from the plurality of trained machine learning models.

In one implementation, the data processing system 100 is pre-configured to use one or a number of trained machine learning models for identifying the one or more candidate groups. In another implementation, the data processing system 100 dynamically determines whether to use one or many trained machine learning models for identifying the one or more candidate groups based on the geometric operation to be performed and/or availability of the suitable trained machine learning models. For example, if the geometric operation is a complex operation, the data processing system 100 may select multiple trained machine learning models from the plurality of trained machine learning models. Similarly, the data processing system 100 may select multiple trained machine learning models based on geometric data set to be processed even if the geometric operation is not complex operation. If the geometric operation is simple operation, the data processing system 100 may select a single trained machine learning model from the plurality of trained machine learning models. The geometric operations may be pre-classified as complex geometric operation and simple geometric operation. The pre-classified geometric operations are stored in a pre-classification index. For example, the geometric operation is pre-classified as complex or simple based on type of geometric operation. The data processing system 100 may determine a geometric operation as complex geometric operation or simple geometric operation based on the pre-classification index.

In accordance with the foregoing embodiments, the trained machine-learning models are generated by training machine learning models based on a candidate training data set. The candidate training data set includes object feature data such as geometrical relationship data, and topological relationship data, and behavioral features data such as heuristic data, domain data, best practice data, context data, and user profile data. For example, the object feature data may include type of object, profile (e.g., line, circular, semi-circular for edges), length, area, color, distance from centroid, curvature, shared objects (e.g., two faces sharing one edge or two edges sharing one face), angle between two objects, volume, material, information about neighboring objects (e.g., attributes of left and right faces of an edge and attributes of left and right edges of a face), distance of body centroids from coordinate systems, and the like. The behavioral feature data may include geometric component or assembly modification history, difference between index of current operation and operation that created the geometric object, types of operation that created the geometric object, information on a reference system that is being used for repeatedly placing objects or assembly components and associated context information, view data and relationship with the selected geometric component, selection settings, etc.

At act 206, feature data associated with the geometric component is generated. The feature data corresponds to object features in the geometric component. The object features correspond to objects in the geometric component. For example, the objects in the rectangular block may include edges, faces, bodies, coordinate systems, planes, etc. The object features may include type of object, profile (e.g., line, circular, semi-circular for edges), length, area, color, distance from centroid, curvature, shared objects (e.g., two faces sharing one edge or two edges sharing one face), angle between two objects, volume, material, information about neighboring objects (e.g., attributes of left and right faces of an edge and attributes of left and right edges of a face), distance of body centroids from coordinate systems, and the like.

At act 208, a plurality of candidates in the geometric component are predicted using the identified trained machine learning model(s). In one embodiment, feature data is input to the trained machine learning models. The trained machine learning model computes a statistical model (e.g., Sigmoidal Activation Function) indicating probability of the geometric operation likely to be performed on each of objects in the geometric component using the input feature data associated with the geometric component. Probability value of each of the objects in the statistical model is compared with a predetermined threshold value. The objects having probability value greater than the predetermined threshold are identified as candidates suitable for performing the geometric operation. For example, objects such as edges of the rectangular block may have probability value greater than the predetermined threshold value when the edge blend operation is to be performed. In such a case, the edges of the rectangular block are selected as candidates. Prediction of candidates in a geometric component may vary from one user to another, as the machine learning model(s) is trained based on user behavior and standard best practices.

One or more candidate groups including one or more candidates are created from the plurality of the candidates based on pre-defined grouping rules. The pre-defined grouping rules may be geometric-relationship based rules, topology-relationship based rules (e.g., edges, faces, solids, vertices, edge type, face type, etc.), context based rules (e.g., similar objects, user preference, etc.), probability based rules, and so on. For example, all edges of the rectangular block are grouped into a first candidate group, vertical edges of the rectangular block are grouped into a second candidate group, and horizontal edges of the rectangular block are grouped into a third candidate group. Alternatively, candidate groups are formed based on objects having probability values falling in different probability ranges. For example, edges of the rectangular block with a probability value between 0.7 to 0.8 are grouped into a first candidate group, edges of the rectangular block with a probability value between 0.8 to 0.9 are grouped into a second candidate group, and edges of the rectangular block with a probability value between 0.9 o 1.0 are grouped into a third candidate group.

At act 210, a candidate group is identified from the one or more candidate groups on which the geometric operation is to be performed. In some embodiments, a probability value for each of the candidate group is computed based on the probability value associated with the candidates in said each candidate group. In these embodiments, the one or more candidate groups are sorted based on the computed probability value for said each candidate group. Accordingly, the at least one candidate group with highest probability value is identified from the one or more candidate groups. For edge blend operation, the first candidate group has a probability value of 0.33, the second candidate group has a probability value of 0.21, and the third candidate group has a probability value of 0.15. In such a case, the first candidate group having a probability value of 0.33 is selected for performing edge blend operation. Additionally, the geometric component highlighting the one or more candidates in the identified candidate group is displayed on a graphical user interface. For example, the rectangular block highlighting all edges in the first candidate group is displayed on the graphical user interface.

At act 212, the geometric operation is performed on the candidates in the identified candidate group. For example, the edge blend operation is automatically performed on all edges of the rectangular block. At act 214, the geometric component is output on the graphical user interface. For example, the rectangular block with rounded edges is output on the graphical user interface. The CAD file including the geometric component (e.g., rectangular block) is generated. In some embodiments, the CAD file may be input to an additive manufacturing system to manufacture the geometric component (e.g., rectangular block).

Figure 3:
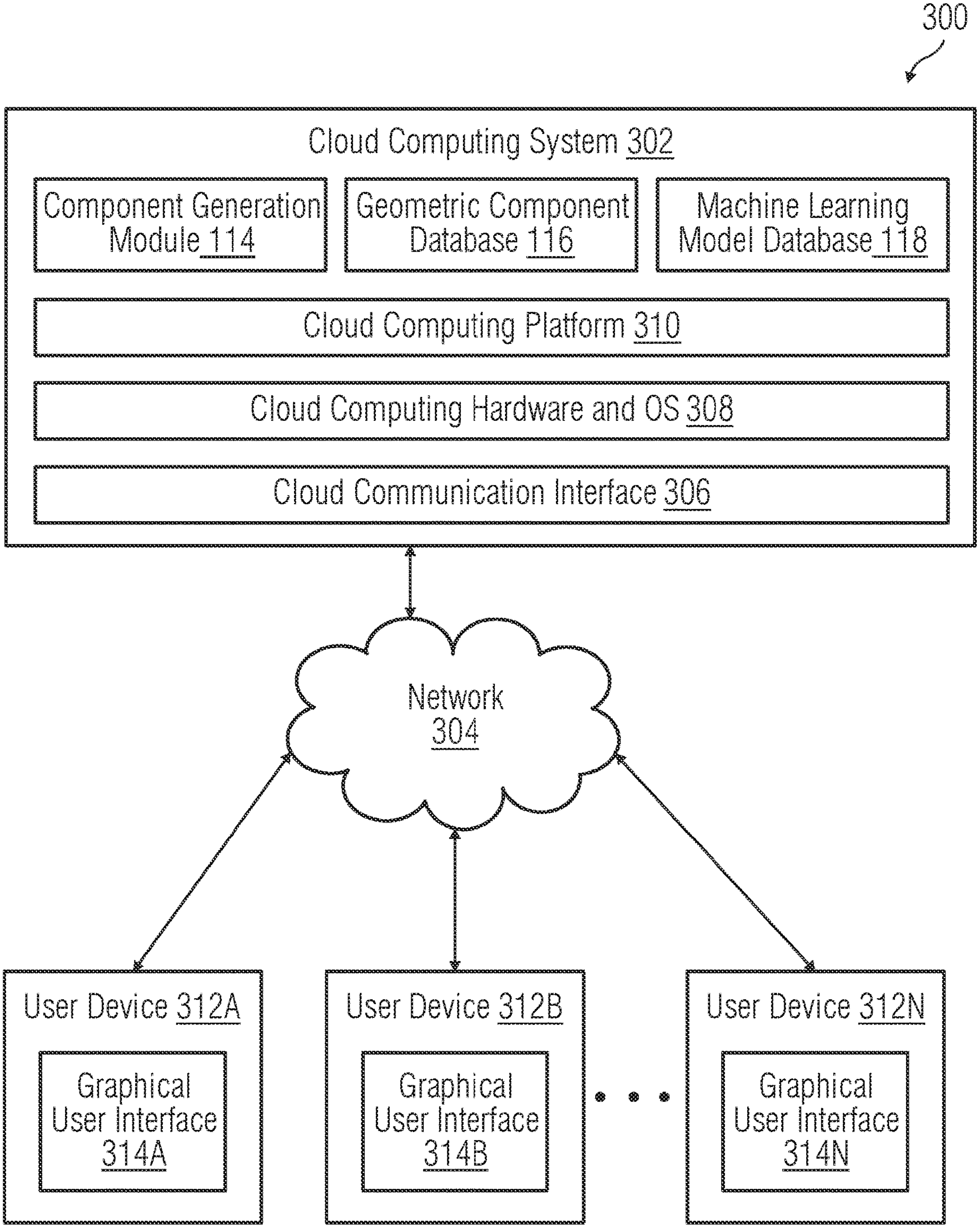
FIG. 3 is a block diagram of a data processing system for generating a geometric component using trained machine learning models, according to another embodiment.

FIG. 3 is a schematic representation of a data processing system 300 for generating a geometric component using machine learning models, according to another embodiment. Particularly, the data processing system 300 includes a cloud computing system 302 configured for providing cloud services for designing geometric components.

The cloud computing system 302 includes a cloud communication interface 306, cloud computing hardware and OS 308, a cloud computing platform 310, the component generation module 114, the geometric component database 116, and the machine learning model database 118. The cloud communication interface 306 enables communication between the cloud computing platform 310 and user devices 312A-N, such as a smart phone, tablet, computer, etc. via a network 304.

The cloud computing hardware and OS 308 may include one or more servers on which an operating system (OS) is installed and includes one or more processing units, one or more storage devices for storing data, and other peripherals required for providing cloud computing functionality. The cloud computing platform 310 is a platform that implements functionalities such as data storage, data analysis, data visualization, and data communication on the cloud hardware and OS 308 via APIs and algorithms, and delivers the aforementioned cloud services using cloud based applications (e.g., computer-aided design application). The cloud computing platform 310 employs the component generation module 114 for generating a geometric component of a physical object using artificial intelligence (AI) algorithm as described in FIG. 2. The cloud computing platform 310 also includes the geometric component database 116 for storing geometric components and/or computer-aided design files for manufacturing the components using additive manufacturing process. The cloud computing platform 310 also includes the machine learning model database 118 for storing the trained machine learning models for determine candidates in a geometric component for performing a geometric operation. Examples of machine learning models may include deep neural network models, random forest models, XGBoost models, and so on. The cloud computing platform 310 may include a combination of dedicated hardware and software built on top of the cloud hardware and OS 308.

In accordance with the foregoing embodiments, the cloud computing system 302 may enable users to design geometric components using machine learning models stored in the machine learning model database 118. For example, the component generation module 114 may determine, using one or more trained machine learning models, candidates (e.g., object such as edges, faces, planes, etc.) in a geometric component on which a geometric operation corresponding to a CAD command selected by a user is to be performed. The component generation module 114 may perform a geometric operation on the selected candidates in the geometric component. In one embodiment, the cloud computing system 302 may enable users to remotely design geometric components using machine learning models by automatically identifying objects on which geometric operation would be performed.

The user devices 312A-N include graphical user interfaces 314A-N for receiving a selection of CAD commands and displaying geometric components. Each of the user devices 312A-N may be provided with a communication interface for interfacing with the cloud computing system 302. Users of the user devices 312A-N may access the cloud computing system 302 via the graphical user interfaces 314A-N. For example, the users may send a request to the cloud computing system 302 to perform a geometric operation on a geometric component using machine learning models. The graphical user interfaces 314A-N may be specifically configured for accessing the component generation module 114 in the cloud computing system 302.

Figure 4:
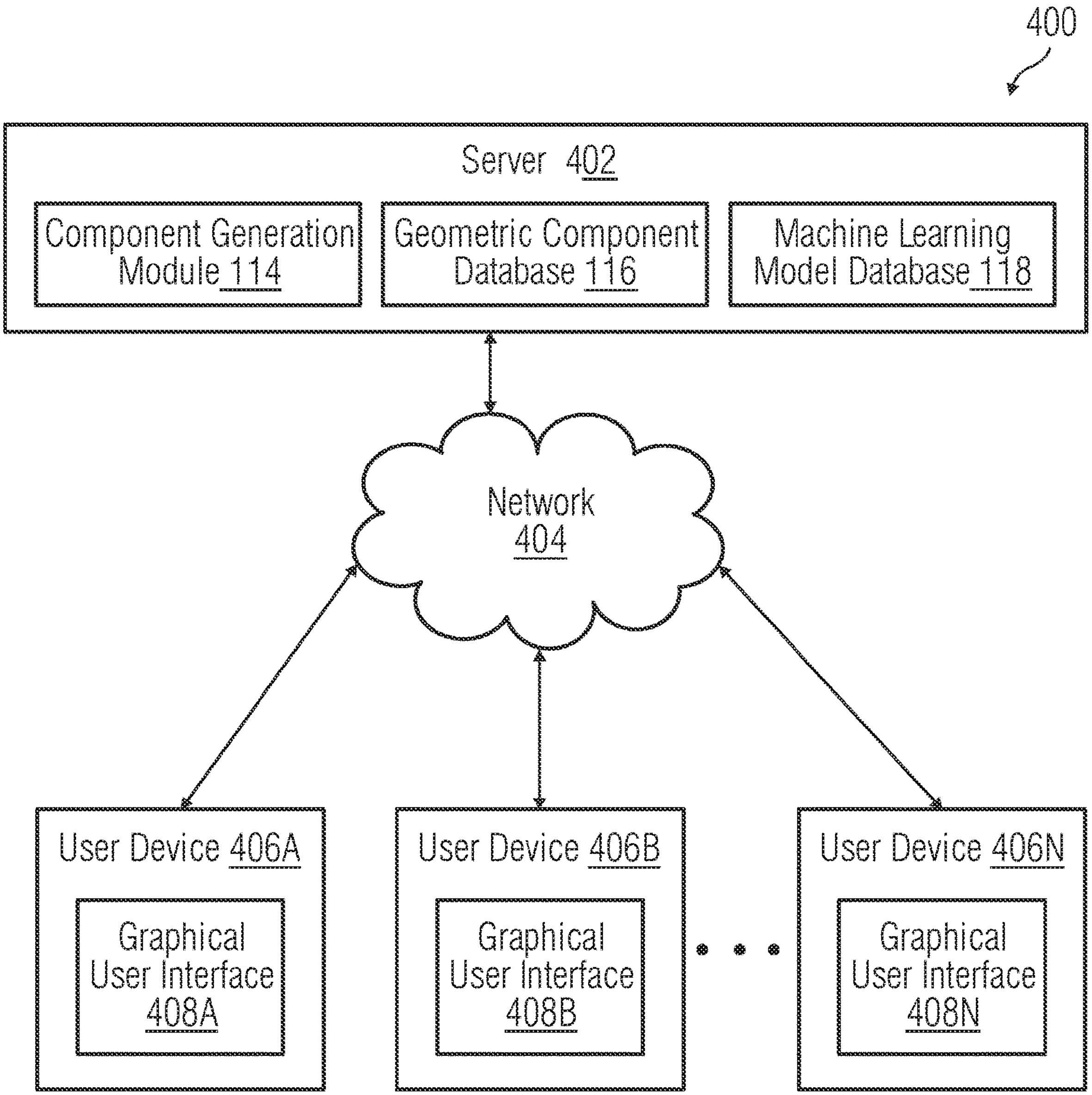
FIG. 4 is a block diagram of a data processing system for generating a geometric component using trained machine learning models, according to yet another embodiment.

FIG. 4 illustrates a block diagram of a data processing system 400 for generating a geometric component using machine learning models, according to yet another embodiment. In one embodiment, the data processing system 400 includes a server 402 and a plurality of user devices 406A-N. Each user device of the plurality of user devices 406A-N is connected to the server 402 via a network 404 (e.g., Local Area Network (LAN), Wide Area Network (WAN), Wi-Fi, etc.). The data processing system 400 is another implementation of the data processing system 100 of FIG. 1, where the component generation module 114 resides in the server 402 and is accessed by user devices 406A-N via the network 404.

The server 402 includes the component generation module 114, the geometric component database 116, and the machine learning model database 118. The server 402 may also include a processor, a memory, and a storage unit. The component generation module 114 may be stored on the memory in the form of machine-readable instructions and executable by the processor. The geometric component database 116 and the machine learning model database 118 may be stored in the storage unit. The server 402 may also include a communication interface for enabling communication with client devices 406A-N via the network 404.

When the machine-readable instructions are executed, the component generation module 114 causes the server 402 to determine objects on which a geometric operation would be performed using a machine learning algorithm, and perform a geometric operation on the objects to generate the geometric component. Method acts performed by the server 402 to achieve the above-mentioned functionality are described in greater detail in FIG. 2.

The user devices 406A-N include graphical user interfaces 408A-N for receiving a selection of CAD commands and displaying geometric components. Each of the user devices 406A-N may be provided with a communication interface for interfacing with the server 402. Users of the user devices 406A-N may access the server 402 via the graphical user interfaces 408A-N. For example, the users may send a request to the server 402 to perform a geometric operation on a geometric component using machine learning models. The graphical user interfaces 408A-N may be specifically designed for accessing the component generation module 114 in the server 402.

Figure 5A:
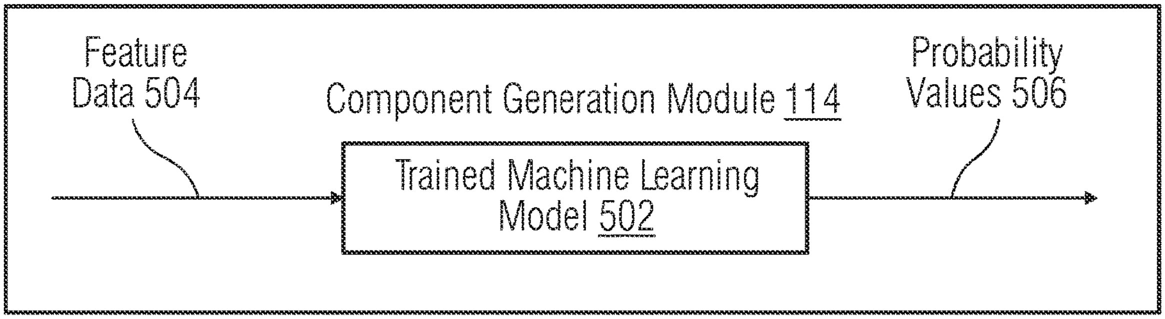
FIG. 5A is a block diagram of a component generation module with a single trained machine learning model, according to one embodiment.

FIG. 5A is a block diagram of the component generation module 114 with a single trained machine learning model, according to one embodiment. As shown in FIG. 5A, the component generation module 114 employs a single trained machine learning model 502 for identifying candidates suitable for performing geometric operation on a geometric component. The trained machine learning model 502 may be a deep neural network model, XGBoost model, random forest model, and the like. The trained machine learning model 502 receives feature data 504 as input. The feature data 504 may correspond to object features associated with the geometric component. In some embodiments, the feature data 504 is in the form of categorical feature data and numeric feature data. The feature data 504 is labelled, encoded, and normalized prior to inputting to the trained machine learning model 502. For example, the feature data is labelled using information associated with the object features. The trained machine learning model 502 analyzes the feature data 504 and computes probability values 506 associated with each object in the feature data 504. The probability values 506 indicate probability of an object qualifying as a candidate for performing geometric operation. For example, if an object is an edge, the probability of the object qualifying as a candidate is high when the geometric operation is an edge blend operation as compared to a face of the geometric component.

Figure 5B:
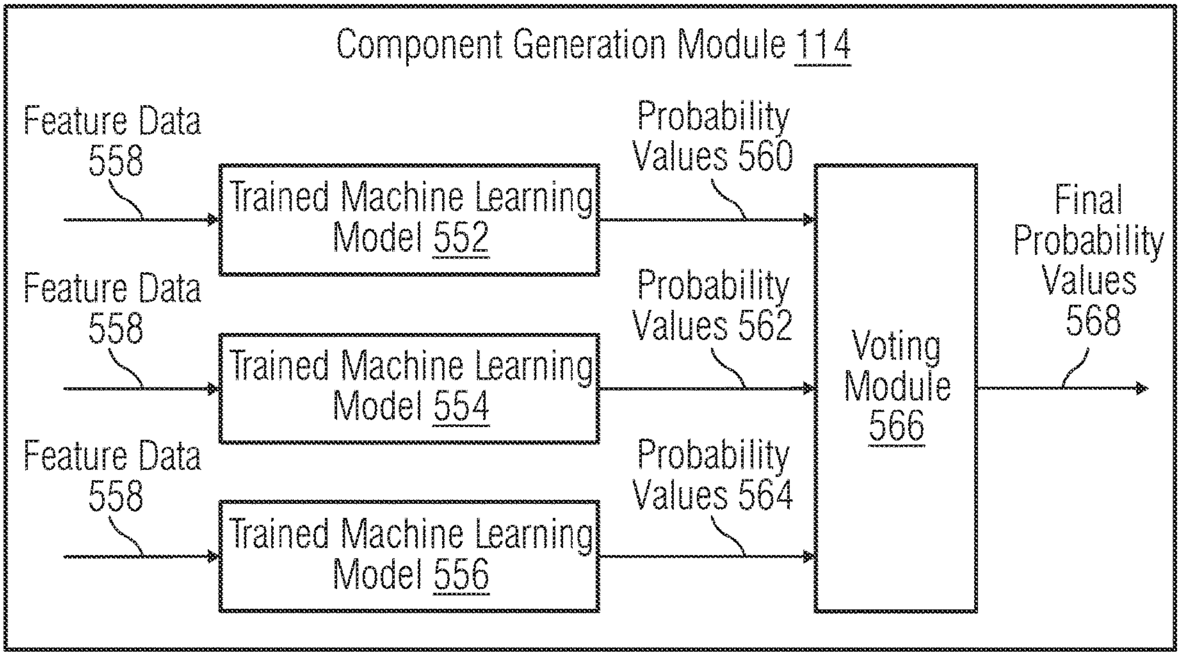
FIG. 5B is a block diagram of a component generation module employing multiple trained machine learning models, according to another embodiment.
Figure 6A:
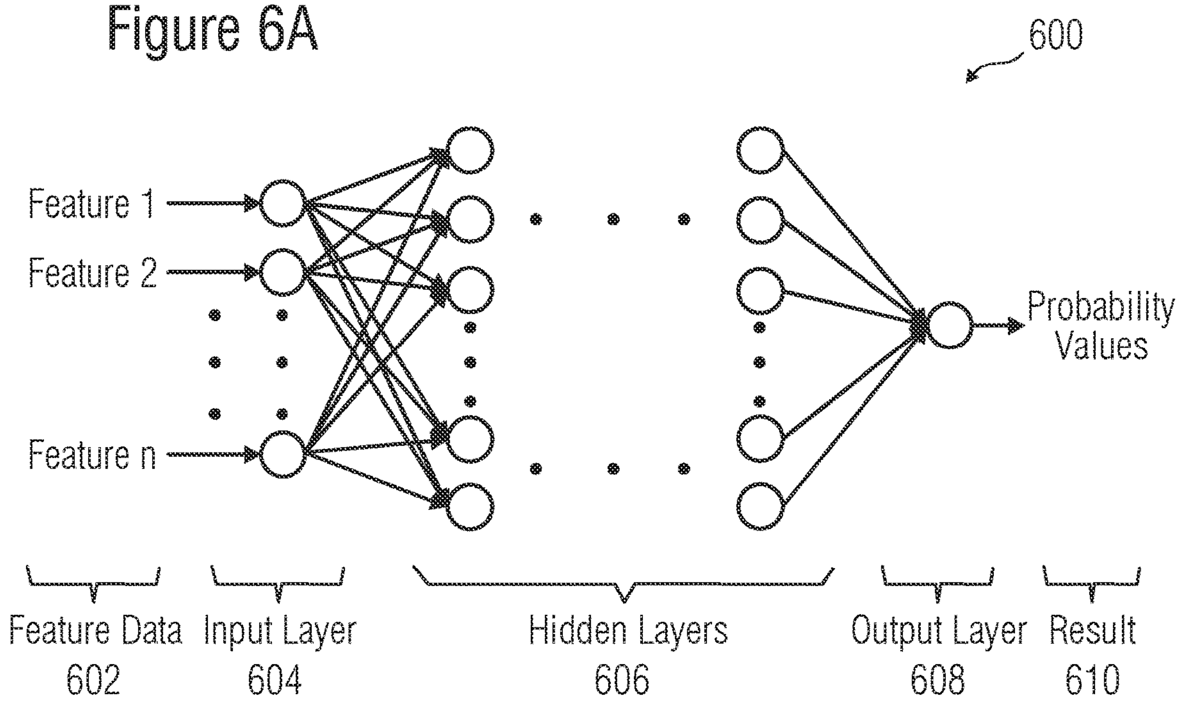
FIG. 6A is a schematic representation of an exemplary trained machine learning model for predicting candidates in a geometric model suitable for performing a geometric operation, according to one embodiment.
Figure 6B:
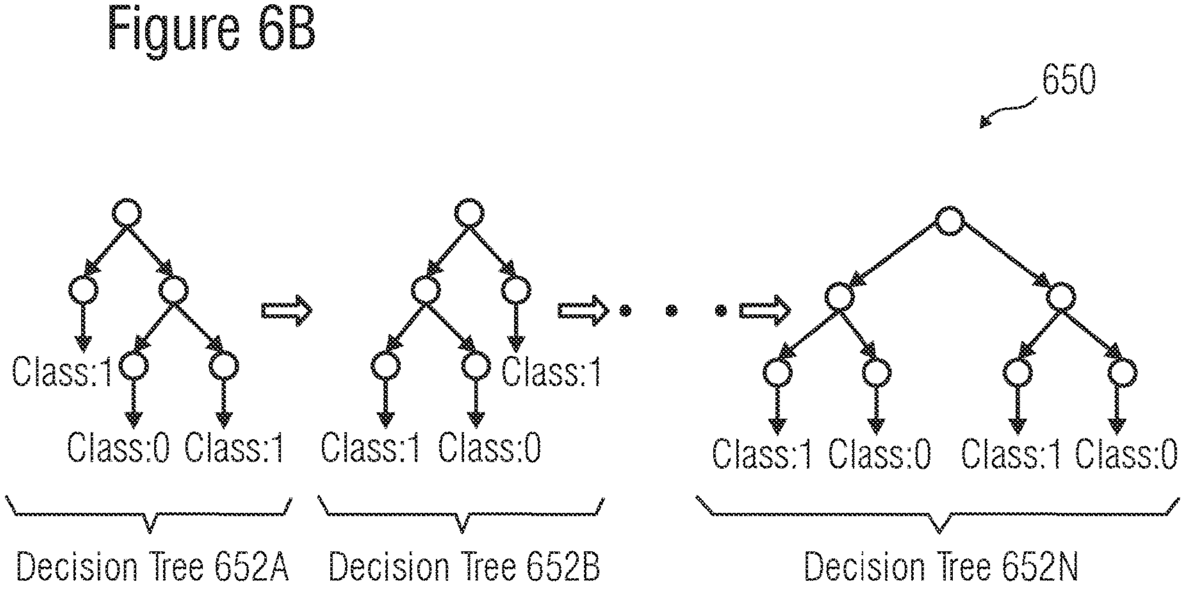
FIG. 6B is a schematic representation of another exemplary trained machine learning model for predicting candidates in a geometric model suitable for performing a geometric operation, according to another embodiment.

FIG. 5B is a block diagram of the component generation module 114 employing multiple trained machine learning models 552-556, according to another embodiment. As shown in FIG. 5B, the component generation module 114 employs the trained machine learning models 552-556. The trained machine learning models 552-556 may be different machine learning models such as deep neural network model, XGBoost model, Random Forest Model, etc. Examples of trained machine learning models are shown in FIGS. 6A and 6B. The trained machine learning models 552-556 are capable of computing probability of performing a geometric operation on each of objects in a geometric component. The trained machine learning models 552-556 are fed with feature data 558. Accordingly, each of the trained machine learning models 552-556 analyzes the feature data 558 and computes probability values 560-566, respectively. The probability values 560-564 indicate suitability of object features in the geometric component for performing the geometric operation. The probability values 560-564 are output by the trained machine learning models 552-556 and are fed to a voting module 566.

The voting module 566 computes final probability values 568 based on the probability values 552-556. In one embodiment, the voting module 566 computes an average probability 568 value for each object feature in the geometric component. For example, the voting module 566 computes a product of constant (e.g., 0.33 in the case of three machine learning models being employed) and probability values 560-564 associated with each object feature in the geometric component. Then, the voting module 566 generates the average probability value 568 for each object by adding normalized probability values of each object feature from the trained machine learning models 552-556. The average probability value 568 for each object feature is compared with a pre-determined threshold value. If the average probability value 568 for each object feature is greater than the pre-determined threshold value, the object feature is considered as a candidate suitable for performing the geometric operation. One skilled in the art would realize that accuracy of predicting candidates suitable of performing geometric operation may improve when multiple trained machine learning models are employed.

FIG. 6A is a schematic representation of an exemplary trained machine learning model 600 for predicting candidates in a geometric component suitable for performing a geometric operation, according to one embodiment. The machine learning model 600 may correspond to the machine learning model 502 of FIG. 5A or any of the machine learning models 552-556 of FIG. 5B. The machine learning model 600 shown in FIG. 6A is a deep neural network model. The deep neural network model 600 includes an input layer 604, hidden layers 606, and output layer 608. Each of the layers 604-608 includes one or more nodes. Each node is associated with a coefficient.

The deep neural network model 600 is recursively trained to accurately predict candidates in the geometric component suitable for performing a specific geometric operation (e.g., edge blend, extrude, assembly, etc.) on the geometric component using a training data set. The training data set may include object feature data and behavioral feature data. During training, the coefficients assigned to each node of the layers 604-608 are refined until output (e.g., probability values) at the output layer 608 matches an expected output (e.g., expected probability values). In one embodiment, the deep neural network model 600 is trained prior to deploying in the component generation module 114. In another embodiment, the deep neural network model 600 is trained post deployment in the component generation module 114 in a self-learning mode.

When the component generation module 114 deploys the deep neural network model 600, the deep neural network model 600 processes input features 602 associated with the geometric component and outputs probability values 610 corresponding to objects in the geometric component as the output layer 608 has Sigmoidal Activation Function. The input features 602 correspond object features associated with the geometric component.

FIG. 6B is a schematic representation of another trained machine learning model 650 for predicting candidates in a geometric component suitable for performing a geometric operation, according to another embodiment. The machine learning model 650 may correspond to the machine learning model 502 of FIG. 5A or any of the machine learning models 552-556 of FIG. 5B. The machine learning model 650 shown in FIG. 6B is a random forest model. The random forest model 650 is an ensembled decision-tree based machine learning algorithm. As shown in FIG. 6B, the random forest model 650 includes multiple decision trees that use Gini-index to create a split, such that each split would reduce Gini-Index of its lower levels. Each decision tree has nodes that employ a condition to decide whether to move to right or left of the decision tree. Upon traversal of each decision tree, each data point reaches a leaf node in the decision tree. The leaf node contains output results that indicate whether the data point would be in class 0 or 1. For example, the data point may correspond to an object in a geometric component. The class 0 may indicate that the object is not suitable for performing the geometric operation. The class 1 may indicate that the object is suitable for performing the geometric operation. The results of all decision trees are used to identify objects (e.g., candidates) that would be suitable for performing the geometric operation. For example, a probability value associated with objects of the geometric operation is computed by dividing a number of instances of positive outcomes (e.g., class 1) by a total number of the decision trees in the random forest model 650.

Figure 7:
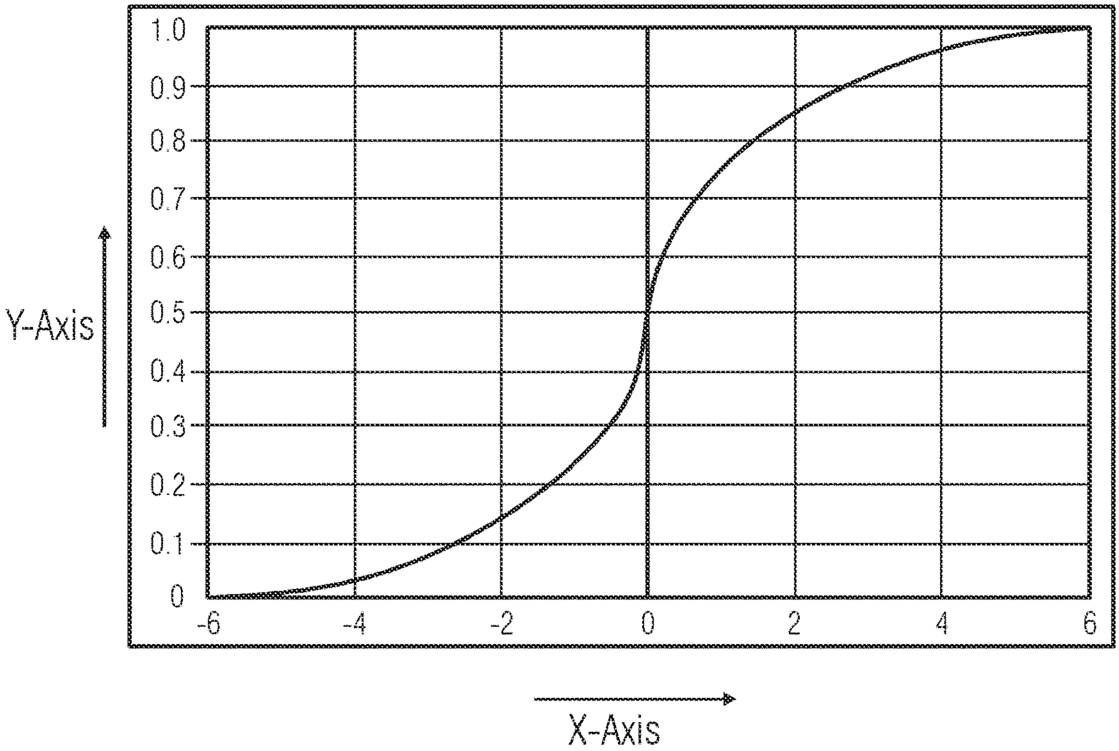
FIG. 7 is a graphical representation of a statistical model generated by the trained machine learning model(s) employed by the component generation module, according to an embodiment.

FIG. 7 is a graphical representation 700 of a statistical model generated by a trained machine learning model employed by the component generation module 114, according to an embodiment. As shown in FIG. 7, the graphical representation 700 depicts a statistical model (e.g., sigmodal function) with predicted probability values ranging between 0 to 1 along Y axis and object feature decomposition along X axis ranging between −6 to +6. Each probability value corresponds to an object feature in a geometric component. The probability value indicates a probability of an object likely to be selected for performing a geometric operation based on suitability of the object for the geometric operation.

The component generation module 114 selects the probability values that are above a predetermined threshold value (e.g., 0.5) based on the statistical model. Then, the component generation module 114 identifies the object features in the geometric component corresponding to the selected probability values as candidates. For example, the component generation module 114 identifies edges of the rectangular block as candidates, as the edges appear to be suitable candidates for the edge blend operation. The component generation module 114 groups the candidates into different candidate groups. For example, the component generation module 114 forms three candidate groups (e.g., a first candidate group including all edges of the rectangular block; a second candidate group including vertical edges of the rectangular block; and a third candidate group including horizontal edges of the rectangular group). Thereafter, the component generation module 114 selects a candidate group with highest probability value from the different candidate groups based on the probability values of the candidates in the candidate groups. For example, the component generation module 114 selects the first candidate group for performing the edge blend operation, as the first candidate group has highest probability value. Accordingly, the component generation module 114 performs the geometric operation on the candidates in the selected candidate group. For example, the component generation module 114 applies edge blend operation on all edges on the first selection group to generate a rectangular block with blended edges.

Figure 8:
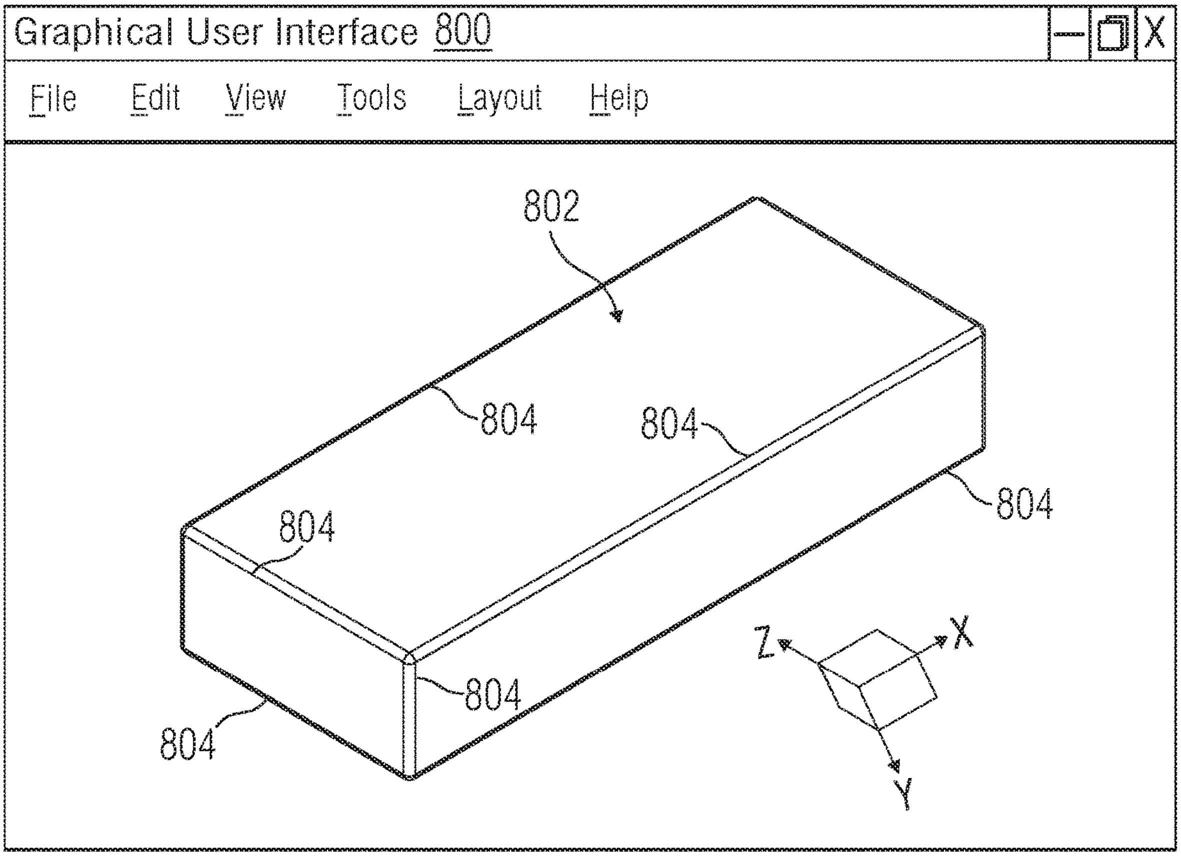
FIG. 8 is a schematic representation of a geometric component generated by the component generation module, according to one embodiment.

FIG. 8 is a schematic representation of a geometric component 800 generated by the component generation module 114, according to one embodiment. As shown in FIG. 8, a rectangular block 800 with blended edges 802 is generated by the component generation module 114 based on an edge blend operation selected by the user. In some embodiments, the rectangular block 800 is displayed on a graphical user interface 801 (e.g., of the display unit 112 of FIG. 1).

In accordance with various embodiments, the data processing system described in FIGS. 1 to 8 enables users to identify candidates suitable for performing a geometric operation using trained machine learning models, and perform the geometric operation on one or more candidates. The data processing enables the user to generate an error-free geometric component, thereby reducing time taken from design to market irrespective of whether the user is a beginner or intermediate level in a job role. The data processing system also reduces cost of rework and validation of a geometric component. The data processing system enables users to train and deploy custom trained machine learning models for performing specific geometric operation based on user behavior and standard organizational best practices. The custom trained machine learning models may be trained to identify candidates in a geometric component in a context-aware manner.

Those skilled in the art will recognize that, unless specifically indicated or required by the sequence of operations, certain acts in the processes described above may be omitted, performed concurrently or sequentially, or performed in a different order.

Those skilled in the art will recognize that, for simplicity and clarity, the full structure and operation of all data processing systems suitable for use with the present disclosure are not being depicted or described herein. Instead, only so much of a data processing system as is unique to the present disclosure or necessary for an understanding of the present disclosure is depicted and described. The remainder of the construction and operation of the data processing system may conform to any of the various current implementation and practices known in the art.

It is to be understood that the system and methods described herein may be implemented in various forms of hardware, software, firmware, special purpose processors, or a combination thereof. One or more of the present embodiments may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device), or propagation mediums in and of themselves as signal carriers are not included in the definition of physical computer-readable medium; physical computer-readable media include a semiconductor or solid state memory, magnetic tape, a removable computer diskette, random access memory (RAM), a read only memory (ROM), a rigid magnetic disk, and optical disk such as compact disk read-only memory (CD-ROM), compact disk read/write, and digital versatile disc (DVD). Both processors and program code for implementing each aspect of the technology may be centralized or distributed (or a combination thereof) as known to those skilled in the art.

While the present disclosure has been described in detail with reference to certain embodiments, it should be appreciated that the present disclosure is not limited to those embodiments. In view of the present disclosure, many modifications and variations would present themselves to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope.

What is claimed is:

1. A computer-implemented method for generating a geometric component in a computer-aided design (CAD) environment, the computer-implemented method comprising:

determining, by a data processing system, a geometric operation to be performed on the geometric component in the CAD environment based on a CAD command selected by a user;

determining one or more candidate groups, each of the one or more candidate groups comprising one or more candidates in the geometric component suitable for performing the geometric operation using one or more trained machine learning models, wherein determining the one or more candidate groups comprises generating feature data associated with the geometric component, wherein the feature data comprises object feature data associated with the geometric component, predicting a plurality of candidates in the geometric component suitable for performing the geometric operation based on the generated feature data using the one or more trained machine learning models, and creating the one or more candidate groups from a plurality of the candidates based on pre-defined grouping rules;

identifying at least one candidate group on which the geometric operation is to be performed from the one or more candidate groups; and performing the geometric operation on the respective one or more candidates in the identified at least one candidate group.

2. The computer-implemented method of claim 1, wherein predicting the plurality of candidates in the geometric component suitable for performing the geometric operation comprises:

computing a probability of the geometric operation likely to be performed on each of the objects in the geometric component using the one or more trained machine learning models; and identifying the plurality of candidates suitable for performing the geometric operation based on the probability of the geometric operation likely to be performed on each of the objects in the geometric component.

3. The computer-implemented method of claim 2, wherein creating the one or more candidate groups from the plurality of the candidates based on the pre-defined grouping rules comprises:

computing a probability value for each of the one or more candidate groups based on the probability value associated with the candidates in the respective candidate group.

4. The computer-implemented method of claim 3, wherein identifying the at least one candidate group from the one or more candidate groups comprises:

sorting the one or more candidate groups comprising the one or more candidates based on the computed probability values for the one or more candidate groups, respectively.

5. The computer-implemented method of claim 1, further comprising:

displaying the geometric component indicating the one or more candidates in the identified at least one candidate group on a graphical user interface.

6. The computer-implemented method of claim 1, further comprising:

identifying the one or more trained machine learning models from a plurality of trained machine learning models based on the geometric operation to be performed on the geometric component.

7. A data processing system for generating a geometric component in a computer-aided design (CAD) environment, the data processing system comprising:

a processing unit; and a memory unit communicatively coupled to the processing unit, wherein the memory unit comprises a component generation module configured to:

determine a geometric operation to be performed on the geometric component in the CAD environment based on a CAD command selected by a user;

determine one or more candidate groups, each candidate group of the one or more candidate groups comprising one or more candidates in the geometric component suitable for performing the geometric operation using one or more trained machine learning models, wherein the determination of the one or more candidate groups comprises generation of feature data associated with the geometric component, wherein the feature data comprises object feature data associated with the geometric component, prediction of a plurality of candidates associated with the geometric operation to be performed on the geometric component based on the generated feature data using the one or more trained machine learning models, and creation of the one or more candidate groups from the plurality of the candidates based on pre-defined grouping rules;

identify at least one candidate group on which the geometric operation is to be performed from the one or more candidate groups; and perform the geometric operation on the one or more candidates in the identified at least one candidate group.

8. The data processing system of claim 7, wherein the prediction of the plurality of candidates in the geometric component suitable for performance of the geometric operation comprises:

computation of a probability of the geometric operation likely to be performed on each of the objects in the geometric component using the one or more trained machine learning models; and identification of the plurality of candidates suitable for performance of the geometric operation based on the probability of the geometric operation likely to be performed on each of the objects in the geometric component.

9. The data processing system of claim 8, wherein the creation of the one or more candidate groups from the plurality of the candidates based on the pre-defined grouping rules comprises:

computation of a probability value for each of the one or more candidate groups based on the probability value associated with the candidates in the respective candidate group.

10. The data processing system of claim 9, wherein the identification of the at least one candidate group from the one or more candidate groups comprises:

sort of the one or more candidate based on the computed probability values for the one or more candidate groups, respectively.

11. The data processing system of claim 7, further comprising:

a display unit configured to display the geometric component indicating the one or more candidates in the identified at least one candidate group on a graphical user interface.

12. The data processing system of claim 7, wherein the component generation module is configured to identify the one or more trained machine learning models from a plurality of trained machine learning models based on the geometric operation to be performed on the geometric component.

13. A non-transitory computer-readable storage medium that stores machine-readable instructions executable by a data processing system to generate a geometric component in a computer-aided design (CAD) environment, the machine-readable instructions comprising:

determining a geometric operation to be performed on the geometric component in the CAD environment;

determining one or more candidate groups, each of the one or more candidate groups comprising one or more candidates in the geometric component suitable for performing the geometric operation using one or more trained machine learning models, wherein determining the one or more candidate groups comprises generating feature data associated with the geometric component, wherein the feature data comprises object feature data associated with the geometric component, predicting a plurality of candidates associated with the geometric operation to be performed on the geometric component based on the generated feature data using the one or more trained machine learning models, and creating the one or more candidate groups from the plurality of the candidates based on pre-defined grouping rules;

identifying at least one candidate group on which the geometric operation is to be performed from the one or more candidate groups; and performing the geometric operation on the one or more candidates in the identified at least one candidate group.

14. The non-transitory computer-readable storage medium of claim 13, wherein predicting the plurality of candidates in the geometric component suitable for performing the geometric operation comprises:

computing a probability of the geometric operation likely to be performed on each of the objects in the geometric component using the one or more trained machine learning models; and identifying the plurality of candidates suitable for performing the geometric operation based on the probability of the geometric operation likely to be performed on each of the objects in the geometric component.

15. The non-transitory computer-readable storage medium of claim 14, wherein creating the one or more candidate groups from the plurality of the candidates based on the pre-defined grouping rules comprises:

computing a probability value for each of the one or more candidate groups based on the probability value associated with the candidates in the respective candidate group.

16. The non-transitory computer-readable storage medium of claim 15, wherein identifying the at least one candidate group from the one or more candidate groups comprises:

sorting the one or more candidate groups based on the computed probability for the one or more candidate groups, respectively.

17. The non-transitory computer-readable storage medium of claim 13, wherein the machine-readable instructions further comprise:

identifying the one or more trained machine learning models from a plurality of trained machine learning models based on the geometric operation to be performed on the geometric component.

* * * * *